United States Patent [19]

Dieterle et al.

[11] Patent Number: 4,860,102
[45] Date of Patent: Aug. 22, 1989

[54] CIRCUITRY FOR AUTOMATICALLY SWITCHING THE CONTROL SPEED OF A PHASE-CONTROL CIRCUIT

[75] Inventors: Franz Dieterle, St. Georgen; Uwe Hartmann; Udo Mai, both of Villingen-Schwenningen, all of Fed. Rep. of Germany

[73] Assignee: Deutsche Thomson-Brandt GmbH, Villingen, Fed. Rep. of Germany

[21] Appl. No.: 192,851

[22] Filed: May 11, 1988

[30] Foreign Application Priority Data

May 23, 1987 [DE] Fed. Rep. of Germany ....... 3717444

[51] Int. Cl.$^4$ .......................... H03L 7/00; H04N 5/04
[52] U.S. Cl. ....................................... 358/158; 331/20
[58] Field of Search ............... 358/158, 159, 148, 149, 358/19; 331/20

[56] References Cited

U.S. PATENT DOCUMENTS 4,461,999  7/1984  Wolf et al. ........................... 358/159
4,553,163  11/1985  Sauer ................................... 358/158

Primary Examiner—Theodore M. Blum
Attorney, Agent, or Firm—Max Fogiel

[57] ABSTRACT

1. Circuitry for automatically switching the control speed of a phase-control circuit.

2.1. The switching is, especially in conjunction with different signal sources employed with a television receiver, either difficult or possible only by reserving prescribed program locations. The advantage of the invention is that it becomes possible to switch over without great expenditure to the higher control speed only while necessary and back to the low speed when it no longer needs to be high.

2.2. The invention is characterized in that a control circuit 12 increases the control speed, independent of whatever signal source is being employed to produce the picture, only during vertical flyback.

2.3. The circuit can be employed in television receivers to reproduce both broadcast television signals and video signals from a recorder connected to the receiver.

3 Claims, 1 Drawing Sheet

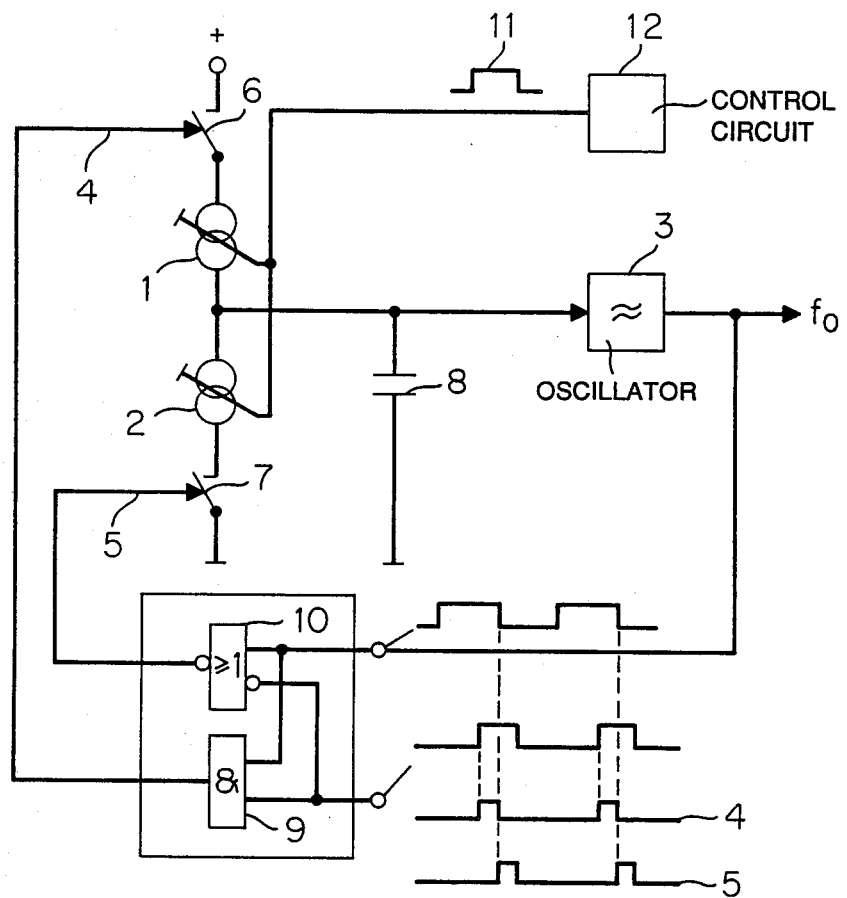

CIRCUITRY FOR AUTOMATICALLY SWITCHING THE CONTROL SPEED OF A PHASE-CONTROL CIRCUIT

The invention concerns circuitry for automatically switching the control speed of a phase-control circuit in accordance with the playback of both broadcast television signals and recorded video signals.

Playing back broadcast television signals demands a low control speed in order to allow smooth synchronization unimpeded by the interference that is present in noisy broadcast signals and would at a high control speed immediately affect synchronization to the extent that the image on the screen would become agitated. This malfunction is called "jitter" and appears on the screen in the form of a horizontal distortion of vertical lines. When recorded signals are processed in a videorecorder on the other hand, the control speed must be high in order to allow rapid correction of phase deviations between the pulses from the horizontal oscillator and the synchronization pulses deriving from the recorder.

Extensive phase deviations occur in particular in the vicinity of the electron-beam flyback because that is where the heads that scan the tape are being switched over. If the control speed of the phase-control circuit is not increased in the presence of video signals from the tape, interference in line synchronization will become evident in the initial lines of the picture. A control speed is attained either by changing the time constant of the filter in the control circuit or by increasing the control current until a capacitor that supplies the control voltage charges or discharges. The control speed is usually changed by providing very definite program locations that can be subjected to a source of VCR signals to activate the change automatically. The procedure, however, is consequently strictly limited to those locations. What is called "AV" drive, whether by way of the SCART jack or the AV jack, currently only allows operation at a high control speed, which is, however, not always absolutely desirable or necessary. A known advantage of a low control speed is that is makes it essentially easier to eliminate interference. The low control speed is accordingly employed when a broadcast signal is being received.

The object of the invention is to eliminate the need for expensive switching with no significant sacrifice in quality or other deleterious results. This object is attained by the invention recited in the major claim.

One embodiment of the invention will now be specified with reference to the drawing.

The FIGURE illustrates a phase-control circuit to be employed in conjunction with horizontal deflection in a television receiver. A phase-control circuit of this type has two sources 1 and 2 of constant current that are alternately activated by the edge of a signal that is derived from an oscillator 3 and that is to be regulated and by a synchronization signal SY as long as the current that charges a capacitor 8 is in equilibrium with the current that discharges it. One possible circuit for controlling contacts 6 and 7 is constructed of logical-conjunction circuits in the form of an AND gate 9 and of a NOR gate 10 that has an inverting input terminal, to which the synchronization signals are applied. At the input terminals of gates 9 and 10 are the synchronization signals and oscillator signals. Their logical conjunctions generate the control voltages in control lines 4 and 5 that are needed for contacts 6 and 7. Sources 1 and 2 of constant current charge and discharge capacitor 8, to which is applied the voltage that controls oscillator 3. The control current, and hence the control speed, is at a prescribed level during the picture forward stroke. The level of the control current, and hence the control speed, can be changed. The switching occurs during the vertical flyback of the electron beams in the picture tube, in the invisible part of the picture, that is. The control pulse 11 for switching the control current is obtained in a practical way from a control circuit 12 which is already present in the receiver. Control circuit 12 is known in the art and is, for this reason, not shown in further detail. The control circuit 12, generates pulse 11 by having a counter which sets a bistable switching circuit at a predetermined instant of time. After an interval of 1.5 msec, this bistable circuit is reset. This time during which pulse 11 lasts, corresponds to 22 line periods in a television picture. This procedure allows phase control to occur rapidly when it has to occur rapidly and slowly when a slow control speed is practical. The frequency response of the filter in the phase-control circuit must in this case be selected to avoid malfunctions due to switching the control speed during picture forward stroke. The control speed of the phase-control circuit can of course be changed by other means, by switching the value of the filter capacitor for example.

We claim:

1. An arrangement for automatically switching the control speed of a phase control circuit comprising: a television receiver with a Picture tube and electron beams; a phase-controlled oscillator circuit in said television receiver; a phase-control circuit in said oscillator for increasing control speed during flyback of the electron beams in said picture tube and decreasing the control speed during the picture forward stroke.

2. An arrangement as defined in claim 1, wherein said phase-control circuit has a control current which is increased for increasing said control speed.

3. An arrangement as defined in claim 1, wherein said phase-control circuit has a filter capacitor which is charged and discharged for increasing and decreasing the control speed.

* * * * *